United States Patent
Pomerantz et al.

(10) Patent No.: US 7,684,552 B2
(45) Date of Patent: Mar. 23, 2010

(54) PHONE BATCH CALLING TASK MANAGEMENT SYSTEM

(75) Inventors: Itzhak Pomerantz, Kfar Saba (IL); Gilad Engel, Kfar Saba (IL); Yitzhak Tzahi Weisfeld, Redmond, WA (US); Erez Baum, Rechovot (IL); Sariel Engel, Tel Aviv (IL)

(73) Assignee: Modu Ltd, Kfar Saba (IL)

( * ) Notice: Subject to any disclaimer, the term of this patent is extended or adjusted under 35 U.S.C. 154(b) by 219 days.

(21) Appl. No.: 11/543,074

(22) Filed: Oct. 5, 2006

(65) Prior Publication Data
US 2007/0154008 A1    Jul. 5, 2007

Related U.S. Application Data

(60) Provisional application No. 60/754,523, filed on Dec. 29, 2005.

(51) Int. Cl.
  *H04M 3/432* (2006.01)
  *H04M 3/44* (2006.01)
(52) U.S. Cl. .............................. 379/201.02; 379/210.02; 379/355.02; 455/414.1
(58) Field of Classification Search ............ 379/216.01, 379/210.01
See application file for complete search history.

(56) References Cited

U.S. PATENT DOCUMENTS

| | | | |
|---|---|---|---|
| 4,140,882 A * | 2/1979 | Regan et al. ........... | 379/207.16 |
| 6,311,191 B1 | 10/2001 | Retallick | |
| 6,381,580 B1 | 4/2002 | Levinson | |
| 6,442,527 B1 | 8/2002 | Worthington | |
| 6,604,059 B2 | 8/2003 | Strubbe et al. | |
| 6,658,102 B1 | 12/2003 | Van Amerongen | |
| 6,760,423 B1 * | 7/2004 | Todd ..................... | 379/202.01 |
| 6,792,087 B2 | 9/2004 | Abdoh | |
| 2003/0206619 A1 * | 11/2003 | Curbow et al. ......... | 379/210.01 |
| 2005/0041793 A1 * | 2/2005 | Fulton et al. ........... | 379/211.01 |
| 2007/0047697 A1 * | 3/2007 | Drewry et al. .......... | 379/88.13 |

* cited by examiner

*Primary Examiner*—Harry S Hong
(74) *Attorney, Agent, or Firm*—Soquel Group LLC

(57) ABSTRACT

A system and method for postponing and managing outgoing calling tasks for on or off-site retrieval are presented. More precisely a system and method are presented to compile a list of pending calling tasks, transfer a task to a calling device and prompt a user to make a call. Optionally the list may contain synchronized sublists, one sublist on a personal computer and a second sublist an a mobile calling device. At the completion of a calling task or other event, the list is automatically updated.

34 Claims, 6 Drawing Sheets

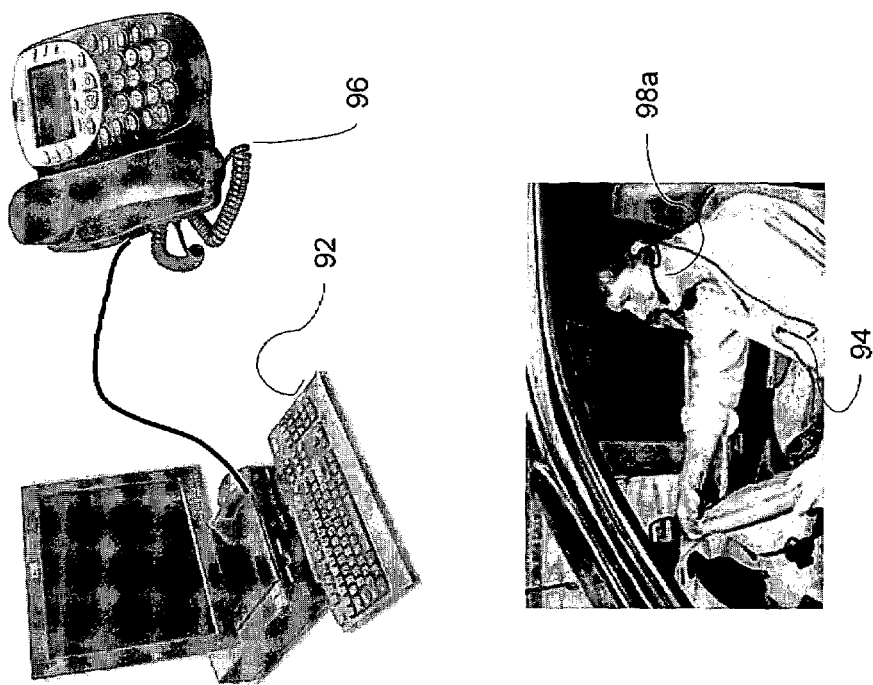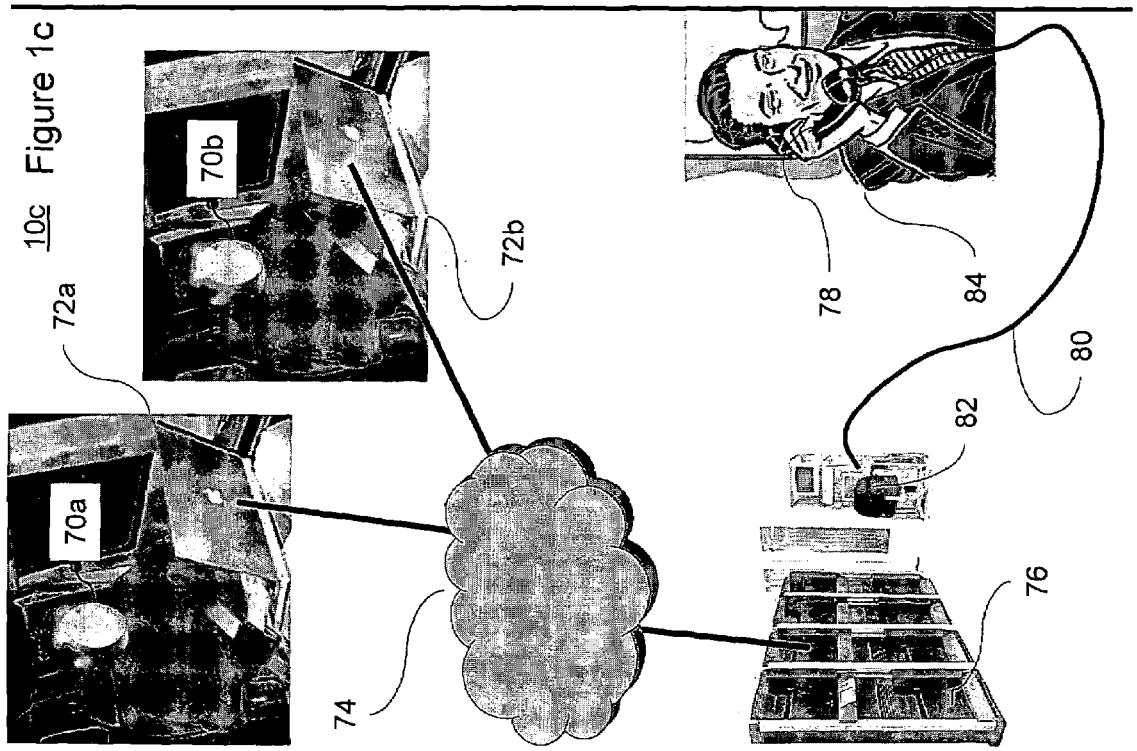

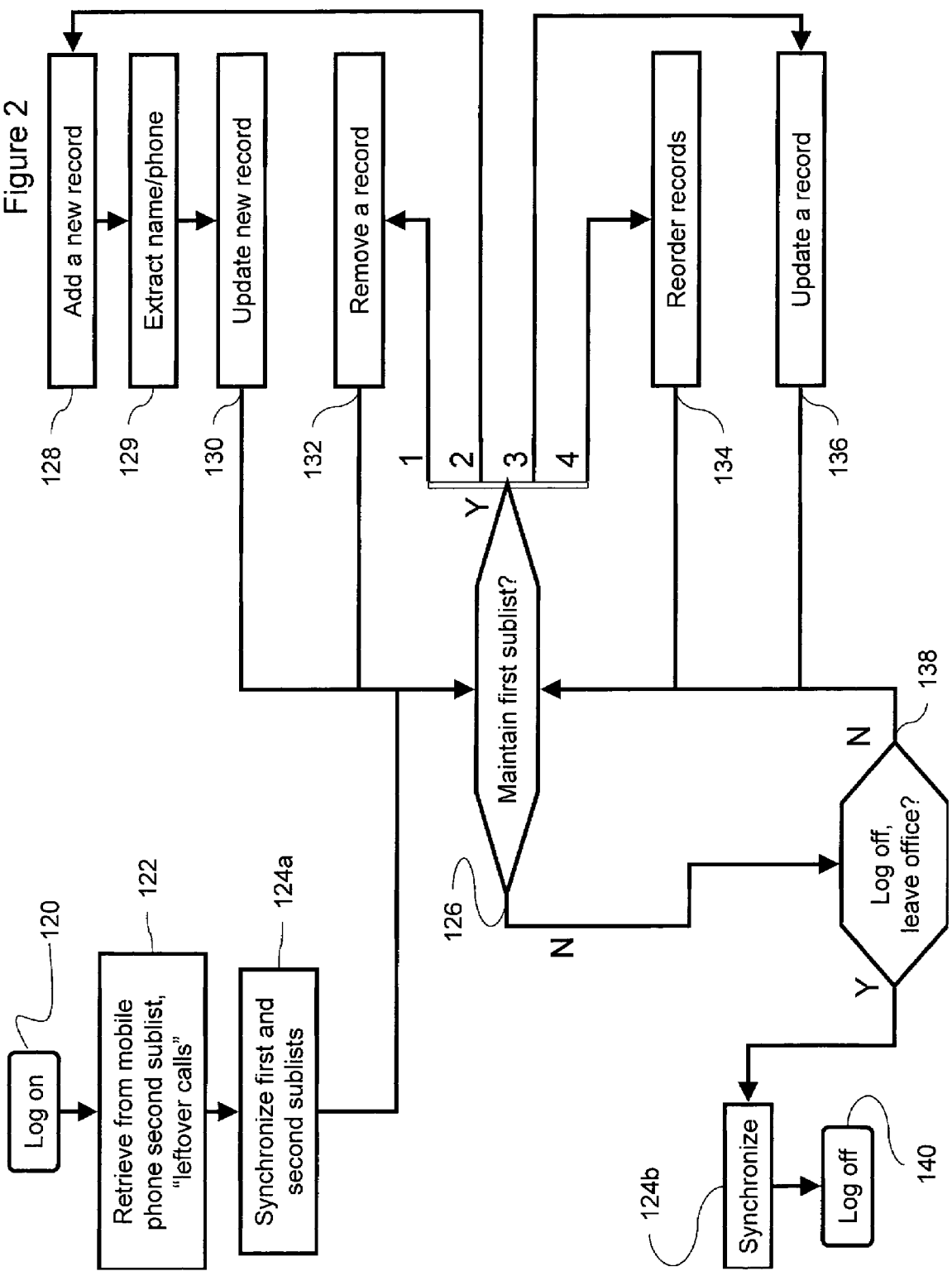

| Name | Telephone number | Earliest time | Latest time |
|---|---|---|---|
| Bill Crown | | | |
| Doris Englander | 234-623-1920 | 09:30 | 22:00 |
| 253-623-9077 | | | |
| Herb Instance | 834-223-4308 | 11:00 | 13:00 |
| Jim@jettravel.co | *contact* | | |

304

| Name | Telephone number | Earliest time | Latest time |
|---|---|---|---|
| Bill Crown | | | |
| Dan | 252-713-8076 | 12:30 | - |
| Car | 834-223-4308 | 12:00 | - |
| Herb Instance | | 11:00 | 13:00 |
| Jim@jettravel.co | 222-326-5689 | | |

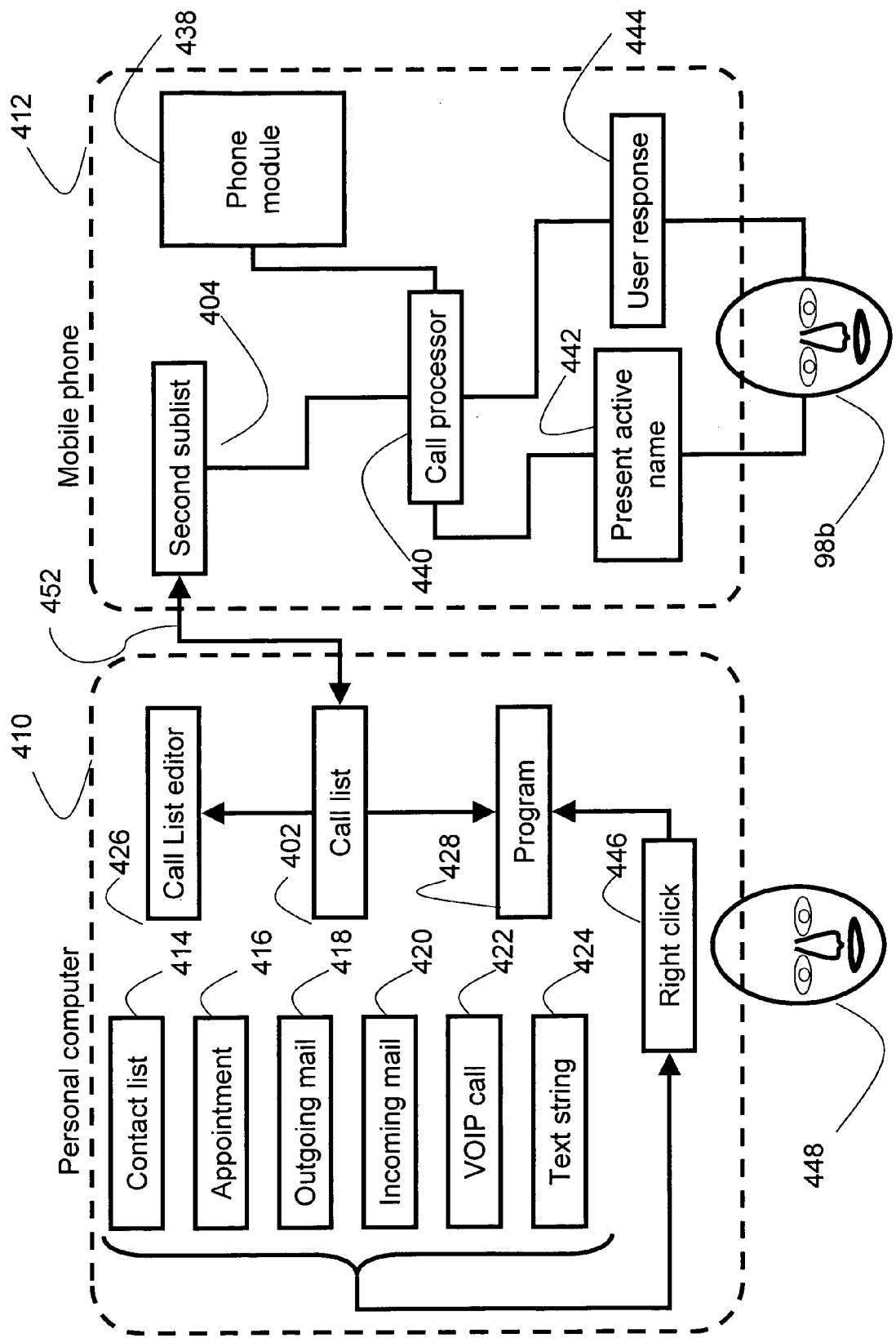

PHONE BATCH CALLING TASK MANAGEMENT SYSTEM

This patent application claims the benefit of U.S. Provisional Patent Application No. 60\754523, filed Dec. 29, 2005.

FIELD AND BACKGROUND OF THE INVENTION

The present invention is a batch method and device to manage and store calling tasks. More particularly, the present invention is a method and device to conveniently store and process pending calling tasks and to facilitate postponing pending calling tasks without unduly burdening the attention of a user.

The use of mobile telephones for making business calls when away from the office is well known in the art of communication. Incoming off-site calls are useful for staying accessible. Outgoing off-site calls are useful for making use of idle time when driving, commuting and waiting.

In order to make outgoing calls, the user needs to be aware of the parties that he needs to call and one or more telephone numbers associated to each party. Furthermore, there may be more information that the user needs to remember for example when is a certain party available at a particular phone number or particular issues that need to be brought up to the party. Some of this information is normally available to the users through their memory and recollection.

Several means are used in the prior art to assist a user. Such means include pieces of paper containing notes, printouts of task-lists from personal computers, reminder calls from a secretary, and so on.

More recently, sophisticated personal data management software packages have been developed for personal data assistants (PDA's) and smartphones. Often these packages contain task lists and contact lists which can be automatically synchronized with the user's personal computer. Such packages (for example Microsoft Outlook) have a flexible user interface and store all kinds of data in a few general-purpose lists and databases. For the purpose of this patent application, the term "outlook" will be used for any personal data management software package that has common features with the Microsoft Outlook software available from Microsoft, USA.

Worthington 2002, (U.S. Pat. No. 6,442,527) teaches a method for personalized time management including setting long term goals, generating tasks and generating schedules and outputting a schedule and tasks list. General-purpose time management programs are very helpful to people who need to organize their time, but become cumbersome for a businessperson whose time is already organized. Such a businessperson would like to be able to put set aside specific tasks and have information available without needing to navigate the complex maze of multiple lists and databases found in a general-purpose time management package. Furthermore, the businessperson would like to postpone and execute pending calls without taking his concentration away from the work he is doing.

Therefore various methods have been developed to facilitate scheduling specific classes of tasks. For example Strubbe et al. 2003 (U.S. Pat. No. 6,604,059) teaches an automated system for detecting and scheduling repetitive tasks.

Phone assistant software has been developed for incoming phone calls wherein a user may need to quickly access or store data outside of an office setting without prior planning. For example Van Amerongen 2003 (U.S. Pat. No. 6,658,102) teaches a calling assistant to help a user handle multiple phone calls simultaneously and access information to give to a party or to store information received from the party during a call.

All of these means to assist memory do not address the typical business scenario by which the number of pending outgoing calls is allowed to accumulate during a work-session in the office, with the intention of making the calls when off-site. The typical busy businessperson prefers to use his office time for activities that require the office infrastructure, such as writing, reading, correspondence, surfing the Internet, meetings and touring the premises. During office hours the businessperson needs to concentrate on these tasks and would prefer not to break his attention to compile lists and schedule phone calls on complicated all-purpose scheduling software. Telephone calls can be made while driving, commuting, or sitting in a restaurant or a waiting room. As such, the user would like to have a convenient way to store phone tasks without undue attention and recall them without interrupting his driving or other activity.

It would be very desirable to provide a convenient solution that will facilitate a process by which a user can "store" outgoing telephone calling tasks while working in the office, and "recall" these tasks when available to make these calls off-site.

SUMMARY OF THE INVENTION

The present invention is a batch method and device to manage and store calling tasks. More particularly, the present invention is a method and device to conveniently store and process pending calling tasks to facilitate postponing pending calling tasks without unduly burdening the attention of a user.

According to the teachings of the present invention there is provided a system for management of a calling task for a user. The system includes a list that contains at least one record. Every record in the list contains a name and each record represents a pending calling task to a party associated with the name contained by the record. At least one record in the list represents a postponed calling task. The system also includes a first device configured to create and maintain the pending calls list, and a second device configured to initiate a new call to an active party associated with an active name included in an active record from the list.

According to the teachings of the present invention there is also provided a method for postponing an outgoing calling task for a user. The method includes the step of compiling in an electronic device a list containing at least one record. Every record of the list includes a name and every record of the list represents a pending calling task to a party associated with the name included in the record. At least one of the records in the list represents a postponed calling task. The method also includes the steps of transferring an active record of the compiled records to a second device, and initiating, automatically via the second device, a new call to a party associated with the active record.

According to the teachings of the present invention there is also provided a method for postponing an outgoing calling task for a user. The method includes the steps of compiling in an electronic device a list containing at least two records and transferring an active record from the list to a second device. The second device automatically initiates a new call to an active party associated with the active record. Upon completion of a call, a new active record is automatically designated from the list.

According to further features in preferred embodiments of the invention described below, the first device is configured to facilitate adding a new record containing a particular name to the pending call list by dragging and dropping an object associated with the particular name into an icon associated with the pending call list.

According to still further features in the described preferred embodiments, a new record can be created from a contact from a contact list, a received e-mail message, a sent e-mail message, a dialed Voice over IP telephone conversation, a segment of text, an Outlook task, or an Outlook appointment.

According to still further features in the described preferred embodiments, at least one record from the postponed call list includes a telephone number, and the telephone number is associated with the record using inclusion and linking.

According to still further features in the described preferred embodiments, the first device is configured to maintain the pending calls list by performing a maintenance operation. Maintenance operations include deleting a defunct record, adding a new record, downloading a new record from the second device, and downloading a new record from a third device.

According to still further features in the described preferred embodiments, the first device is further configured to convert a reminder of an approaching appointment into the active record.

According to still further features in the described preferred embodiments, at least one of the records in the pending call list further includes an alternative telephone number.

According to still further features in the described preferred embodiments, the party to be called is a plurality of people and the pending call list includes a conference call.

According to still further features in the described preferred embodiments, the second device is configured to present the name of a party from the active record to the user and to receive a response, from the user. The response may include instructions to initiate a call to the party, to skip the active record or to delete the active record from the pending call list.

According to still further features in the described preferred embodiments, the second device is further configured to change a method of presentation of the active name in response to a state of the second device.

According to still further features in the described preferred embodiments, the first device is configured to add a new record to the pending calls list according to an instruction from an authorized person.

According to still further features in the described preferred embodiments, the system also includes a third device configured to convey list maintenance instructions from an authorized person to the first device.

According to still further features in the described preferred embodiments, the active record further includes a time interval acceptable to initiate a call to the party associated with the record.

According to still further features in the described preferred embodiments, the first device is configured to skip a call when a current time is outside of the acceptable time interval for calling the party associated with the active record According to still further features in the described preferred embodiments, the acceptable time for making a call is adjusted according to a caller time zone and a time zone of the party receiving the call According to still further features in the described preferred embodiments, the first device is further configured to perform a maintenance operation on the pending call list in response to an incident. Such an incident could include initiation of the new call, initiation of an independent call to a party associated with one of the records, receiving a call from a party associated with one of the records, receiving an SMS message from a party associated with one of the records, receiving an e-mail from a party associated with one of the records, receiving an instruction conveyed via a data communication service from an authorized person, receiving an instruction from an automatic list cleaning algorithm, receiving by the second device of an unanswered telephone call, initiating on the second device of an unanswered phone call, initiating on the second device of a call to a party associated with one of the records, downloading information from a third device or a receiving a scheduled instruction.

According to still further features in the described preferred embodiments, the first device is configured to add a new record to the pending call list in response to an occurrence. Such occurrences include the coming due of an Outlook scheduled notice, a time lapse since a previous call, a missed call, or an unanswered call.

According to still further features in the described preferred embodiments, the first device and the second device are both included in a single mobile phone. Examples of a mobile phone include a smartphone or a laptop computer capable of facilitating oral communication over a network.

According to still further features in the described preferred embodiments, the second device is a mobile device and the first device is separate from the mobile device. A communication channel is used to transfer the active name from the first device to the second device.

According to still further features in the described preferred embodiments, the first device is located at a site and the second device is configured to initiate a call from the pending call list at a remote location not on the site of the first device. A communication channel is used for transferring the active record from the first device to the second device.

According to still further features in the described preferred embodiments, the pending call list includes a first sublist residing in the first device and a second sublist residing in the second device. The second device is configured to make calls independently without intervention of the first device to parties associated with records in the second sublist. A communication channel is used for synchronizing the first sublist and the second sublist.

According to still further features in the described preferred embodiments, the first device is configured to detect an instance of an unmatched record contained only in the first sublist. The first device is further configured to synchronize the first and second sublists by copying the unmatched record from the first sublist to the second sublist, by moving the unmatched record from the first sublist to the second sublist or by deleting the unmatched record from the first sublist.

According to still further features in the described preferred embodiments, the second device is configured to maintain the second sublist by performing a maintenance operation in response to an incident.

According to still further features in the described preferred embodiments, the first device is a personal computer and said second device is a mobile phone.

According to still further features in the described preferred embodiments, a new record containing a new name is added to the pending call list by dragging and dropping an object associated with the new name into an icon associated with the pending call list.

According to further features in the described preferred embodiments, the user is prompted by the second device to initiate a new call, and the user instructs the second device to initiate the call in response to the prompting.

According to still further features in the described preferred embodiments, the user responds to a prompt to make a call by giving instructions to initiate a new call, to skip the active record without initiating a new call, or to delete the active record.

According to still further features in the described preferred embodiments, the second device is a mobile device.

TERMINOLOGY

For the sake of the current invention, the following definitions are used:

active name—a name included in an active record;
active party—a party associated with an active name;
active record—the list member currently queued for action in a list of records;
call—a real time communication link between two people or between a person and an information processing device;
contact list—a list of persons and organizations, containing names, telephone numbers and optionally email addresses, which is accessible to a user of a personal computer and to software applications running on a personal computer, similar to the contact list in Microsoft Outlook.
incident—an event expected to have influence on an intention to make a call;
mobile phone—a device capable of wireless communication over a voice network;
name—a character string distinguishing the party to be called; a name could be a proper name, a telephone number or title;
occurrence—an event commonly associated with a need to make a call;
outlook—any personal management software that has common features with the Microsoft Outlook software available from Microsoft, USA;
pending calling task—a known responsibility to call a certain party, at the present or in the future;
postponed calling task—an intentionally deferred responsibility to call a certain party.

BRIEF DESCRIPTION OF THE DRAWINGS

The invention is herein described, by way of example only, with reference to the accompanying drawings, where:

FIG. 1c shows a third embodiment of the current invention wherein multiple authorized persons upload call lists onto a server, and a user makes calls from a traditional telephone;

FIG. 1d shows a fourth embodiment of the current invention wherein a first sublist is stored by an authorized person on an office computer and a second synchronized sublist is stored on a smartphone;

FIG. 2 is a flowchart of an office work session according to the fourth embodiment of the present invention;

FIG. 4 is a list (including two sublists) of postponed calling tasks according to the fourth embodiment of the current invention;

FIG. 5 is an overview of the present invention.

DESCRIPTION OF THE PREFERRED EMBODIMENTS

The principles and operation of a method and device for mobile phone calling task management according to the present invention may be better understood with reference to the drawings and the accompanying description.

Figure 1B:
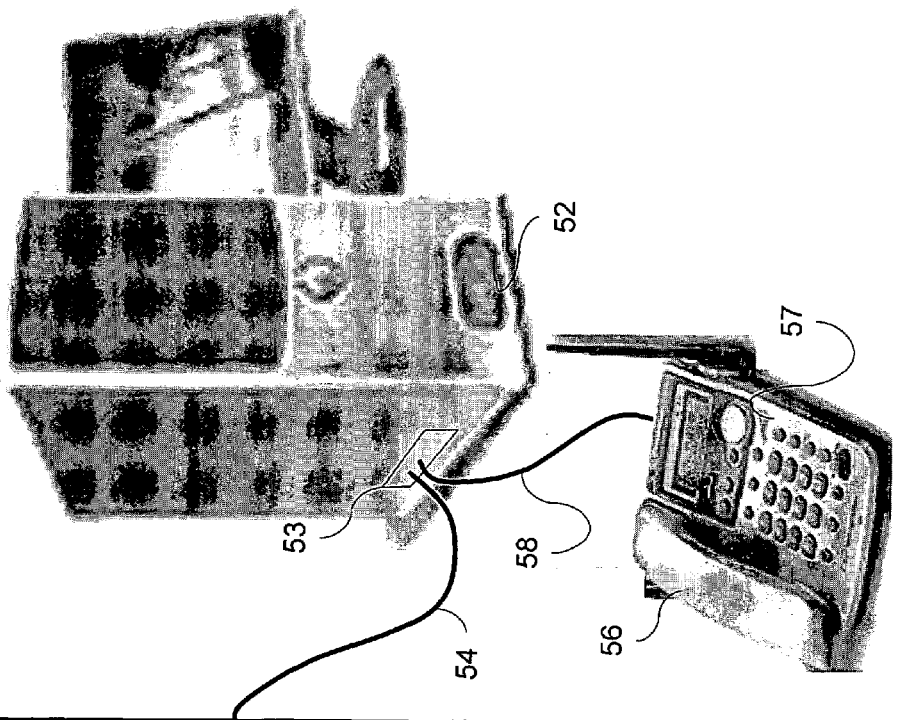
FIG. 1b shows a second embodiment of the current invention to store and effect a postponed call including a list management device in a desktop computer and a calling device in a cordless phone.
Figure 1A:
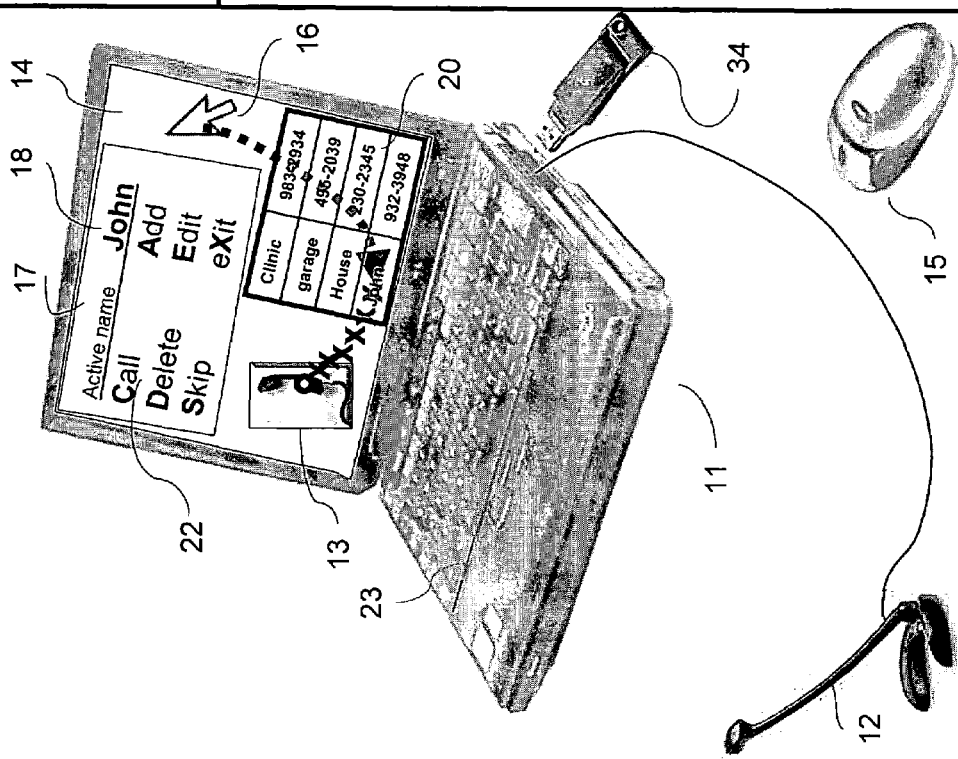
FIG. 1a shows a first embodiment of the current invention to store and effect a postponed call including a first list management device and a second calling device both devices being contained in a laptop computer.

Attention is now called to FIG. 1a, showing a first embodiment 10a of the current invention. In embodiment 10a a laptop computer 11 contains a first device to maintain a list of calling tasks (the first device including a CPU, an internal hard disk and a software routine) and a second device to initiate a call (the second device including a wireless internet connection, a voice over Internet (VOIP) software package, a soundcard, internal speakers and an external microphone 12).

Whenever the computer is running a call list icon 13 is displayed on the computer monitor 14. Icon 13 serves to activate the process of the current invention. For example, using mouse 15, a user positions a cursor 16 onto a name (John) from a contact list 20 and drags (illustrated by the x's) the name John and drops (illustrated by the open circle) the name John into icon 13. Dropping the name John into icon 13 causes a new active record containing the name John to be appended to a list of names of pending phone calls and opens a program window 17 presenting the name John as an active name 18. Along with the name "John" other pertinent information, for example a telephone number "932-3948", is extracted from contact list 20 and added to the new active record.

Another method of adding records to the list of pending calls is by means of a file containing data concerning pending calls. For example a Microsoft XL file containing data on pending calls is stored on flash disk 34. The user drags the file from a File Explorer window into call list icon 13. Automatically the call list program adds a new record to the call list for each non-empty row in the XL file and extracts a name or phone number from each non-empty row, inserting each name and phone number into a corresponding record in the call list.

Also displayed on program window 17 is a menu 22. A menu item (in embodiment 10a the menu items are Call, Delete, Skip, Add, Edit and eXit) may be selected when window 17 is active either by depressing on a keyboard 23 a letter corresponding to the capitalized letter of the menu item or by clicking on the item (using mouse 15 and cursor 16). When a menu item is chosen, laptop computer 11 performs the corresponding action. Thus, when window 17 is active and the user depresses C on keyboard 23 or clicks on the menu item Call, a modem card contained in laptop computer 11 initiates a voice over IP call to the party associated with the name John by dialing the phone number associated with active name 18 (John) in contact list 20 (932-3948 in the example of embodiment 10a).

Attention is now called to FIG. 1b, which is a second embodiment 10b of a device to manage postponed calling tasks according to the current invention. Embodiment 10b includes a desktop computer 52, which is hardwired via a modem 53 to a telephone line 54. A second device, which is an ordinary cordless telephone 56, is in communication via microwaves with a phone base 57. For the sake of the current patent application cordless phone 56 is defined as a mobile device because cordless phone 56 is capable of initiating a phone call without a hardwired connection to a stationary object and because cordless phone 56 can be lifted by a single person. Phone base 57 is in turn connected through an intermediate line 58 to modem 53 and through modem 53 to telephone line 54.

The boot up routine of computer 52 activates in background a call batch program. The call batch program monitors activity on modem 53. A user is at home, but cannot sit in front of desktop computer 52 (in the example of embodiment 10b the user is sitting in the back yard supervising his children in his swimming pool). The user wishes to utilize his time to catch up on business calls and therefore sends a child to bring cordless telephone 56. Upon receiving cordless phone 56 from the child, the user turns on the phone and dials a launch code (for example *5455). As when dialing an ordinary phone call, phone base 57 receives microwave instructions from cordless phone 56 and transmits the corresponding signals through intermediate line 58 via modem 53 to telephone line 54. The launch code is not a legitimate phone number and therefore does not directly initiate a call to another party. Nevertheless, when computer 52, which is monitoring activity on modem 53, detects that the launch code is the first number dialed after turning on cordless telephone 56, computer 52 instructs modem 53 to temporarily block signals between phone base 57 and telephone line 54 and to hang up line 54 while continuing normal activity across intermediate line 58. Thus, phone base 57 and cordless phone 56 remain in active communication even though there is no external call in progress. Then computer 52 fetches an active name "John Doe" from an active record in a call list stored in the memory of computer 52. Computer 52 then instructs modem 53 to prompt the user with a synthesized voice, "Call list activated. Call John Doe?" and computer 52 monitors activity on modem 53 while waiting for a response from the user. The user responds with a coded reply, for example by speaking into cordless phone 56 the word "call." Speaking the word "call" into cordless phone 56 causes cordless phone 56 to initiate a call as follows: Cordless phone 56 transmits the microwave signal corresponding to the word "call" to phone base 57 as if the user had said the word call in a normal phone conversation. Phone base 57, also as if in the course of a normal phone conversation, sends a corresponding signal through intermediate cable 58 to modem 53. When computer 52, which is monitoring activity on modem 53, detects, using speech recognition techniques that are well known in the art of computer telephony interfaces, such as used for voice dialing, a signal corresponding to the word "call," computer 52 instructs modem 53 to activate line 54 and to send a dialing code corresponding to the phone number of "John Doe" to line 54. Simultaneously, computer 52 instructs modem 53 to synthesize a signal corresponding to the words "calling John Doe, star fifty five to quit." Then computer 52 instructs modem 53 to reconnect intermediate line 58 to line 54 allowing the user to continue a normal telephone call. Computer 52 continues to monitor activity over modem 53.

In the example of embodiment 10b, John Doe does not answer his phone. After seven rings, computer 52 instructs modem 53 to prompt the user with a synthesized voice over cordless phone 56, "John Doe not answering, terminate?" and the user responds, "wait," over cordless phone 56 causing a corresponding signal to reach modem 53. Upon detecting the signal corresponding to the word "wait," computer 52 continues monitoring modem 53 while John Doe's phone rings another 7 times.

After 7 more rings, computer 52 again prompts the user with the synthesized signal, "John Doe not answering, terminate?" and the user responds by stating the word, "hang up" into cordless phone 56. Upon detecting the signal corresponding to the words "hang up" over modem 53, computer 52 instructs modem 53 to hang up line 54 without terminating communication through phone base 57. Thereafter, computer 52 moves the record corresponding to John Doe to the top of the call list and designates a record from the bottom of the list as a new active record. The name in the new active record is "Jay's landscaping." Computer 52 instructs modem 53 to present the active name to the user by transmitting via phone base 57 to cordless phone 56 a synthesized voice prompt, "call Jay's landscaping?" The user responds into cordless phone 56, "skip." Upon detecting the signal corresponding to "skip" over modem 53, computer 52 places the record corresponding to "Jay's landscaping" onto the top of the call list (moving the record containing John Doe to the second slot) and designates a second new active record having the name "9592856."

Computer 52 instructs modem 53 to prompt the user with the synthesized words "call 9592856" over cordless phone 56. The user responds by speaking the code word, "call," into the receiver of cordless phone 56. Upon detecting the signal corresponding to the word "call," computer 52 instructs modem 53 to send a dialing code corresponding to the phone number of "9592856" to line 54. Simultaneously, computer 52 instructs modem 53 to synthesize a signal corresponding to the words "calling 9592856, star fifty five to quit," and transmit the signal to cordless phone 56 via intermediate line 58 and phone base 57. Then computer 52 instructs modem 53 to reconnect intermediate line 58 to line 54 allowing the user to continue a normal telephone call. Computer 52 continues to monitor activity over modem 53.

In the example of embodiment 10b, a young child of the intended party at 9592856 answers the phone. After a few minutes of trying to get the child to explain where is his mother, the user gives up on the phone call and presses the keys *55 on cordless phone 56. Computer 52 detects the quit signal over modem 53, and hangs up line 54 while keeping open the connection between modem 53 and cordless phone 56. Computer 52 then automatically designates a third new active record containing the name "Bob" and prompts the user, "Call terminated, delete and call Bob?" If the user responds "call" or "delete and call," then computer 52 deletes the second new record containing 9592856 from the call list and connects the user to "Bob". If the user answers "delete and skip" then computer 52 deletes second new record containing 9592856 from the call list and designates a fourth new active record and presents the name in the active record to the user by prompting the user accordingly. In the example of embodiment 10b the user responds "skip and end." Accordingly computer 52 replaces the second new record containing 9592856 into the call list and hangs up connections to line 54. The user then turns off cordless phone 56.

A third embodiment 10c of the current invention is shown in FIG. 1c. In the example of embodiment 10c, two authorized persons, political party activists 70a and 70b, compile lists of follow-up calls for a mayoral election. Along with the name and phone number of the party to be called, a record in the list can contain an explanatory note, for example identifying the party to be called or reminding the user of the objective of the phone call. When a record is presented to the user for execution, the note is read to the user using well-known "text to speech" devices (such as "via voice" of AT&T). Each activist of 70a-b uses a respective third device, laptop computers 72a and 72b. Each activist 70a-b sends his list via a wireless Internet connection 74 to a first device, a server 76 located at the party headquarters. Server 76 concatenates the list of activist 70a with the list of activist 70b into a single call list.

The single call list can be accessed by any touch-tone telephone. The telephone may be located on-site in the building of server 76 or offsite far from server 76. For example, in the evening after a day of campaigning, mayoral candidate 84 returns home, eats dinner and then calls from a second device, his home phone 78 (a traditional touch tone phone) via a traditional hardwire phone network 80 to a modem 82 connected to server 76. It is understood that according to embodiment 10c access to the call list is not limited to a single device (home phone 78). For example, when candidate 84 is at home he accesses the call list via home phone 78. When candidate 84 is not at home, he accesses the call list by calling server 76 on an alternative device (for example a mobile phone or a public phone or another available phone). When modem 82 answers the call, candidate 84 dials a secret access code into home phone 78, upon receiving the access code, server 76 starts the call list function. It is understood that in place of a password, server 76 may identify a user by other methodologies known in the art. Some alternative methods of identification are voice recognition or when the system is accessed by home phone 78 or a mobile phone belonging to candidate 84, server 76 recognizes the telephone used to access the system.

Upon activation of the call list function, server 76 fetches an active name "Bill Smith" from an active record of the call list. Along with the name "Bill Smith" and a phone number, the active record also contains a note, "Bill is the president of the Blueberry Hill Oaks Lodge, get his endorsement." Thus, server 76 transmits a synthesized voice prompt via modem 82, network 80 and phone 78 to candidate 84 stating "Call list activated. Call Bill Smith? Bill is the president of the Blueberry Hill Oaks Lodge, get his endorsement. To call depress 1; to skip depress 2; to delete depress 3; to end depress 4." In response, candidate 84 depresses the 1 button on phone 78. Upon detecting the 1 tone of phone 78 over modem 82, server 76 makes a call to Bill Smith and connects the call via modem 82 and network 80 to phone 78 while continuing to monitor modem 82.

At the end of the conversation, Bill Smith hangs up his phone. When server 76 detects that the line to Bill Smith has been cut, server 76 keeps the line to candidate 84 open and automatically designates a new active record with corresponding name "Janet Johnson" from the concatenated call list. In the example of embodiment 10c, Janet Johnson, an important constituent of candidate 84 is currently on an international assignment in Singapore. Therefore activist 70a has placed in the call list Janet Johnson's overseas phone number. Server 76 is configured to detect international dialing codes, to compute time changes, to automatically inform the user and to choose an available network to make a call. A low-cost available network for the call to Janet Johnson is a voice over Internet phone call (VOIP). Thus server 76 prompts candidate 84, "Connection lost to Bill Smith please depress 1 to call Bill Smith again; 2 to delete Bill Smith from the call list or 3 to keep Bill Smith in the call list.

When candidate 84 depresses the 2 key on touch tone phone 78, server 76 deletes the record containing Bill Smith from the call list and further prompts candidate 84, "call Janet Johnson in Singapore?, the time in Singapore is nine twenty five AM; To call depress 1; to skip depress 2; to delete depress 3; to end depress 4." In response, candidate 84 depresses the 1 button on phone 78. Upon detecting the 1 tone of phone 78 over modem 82, server 76 places a VOIP call to Janet Johnson and connects the VOIP line to modem 82. Thus candidate 84 uses the current invention to make a cheap VOIP call conveniently and automatically from his home using a traditional local phone line. At the end of the conversation with Janet Johnson, candidate 84 hangs up home phone 78. When server 76 detects that candidate 84 has hung up home phone 78 after a conversation of more than 1 minute with Janet Johnson, server 76 automatically disconnects the VOIP call to Janet Johnson and deletes the record containing Janet Johnson from the call list. Alternatively if Janet Johnson did not answer her phone, or if the conversation with Janet Johnson had been less than one minute, then the default action (resulting from hanging up home phone 78) would have been closing the call to Janet Johnson, but keeping the record containing Janet Johnson in the call list.

It is understood that other users may have full or partial access to modify or read the call list. For example activists 70a and 70b add records to the list, but cannot remove or read records. In alternative embodiments, campaign workers may be able to also delete records or read records or to make calls in place of candidate 84. FIG. 1d shows a fourth embodiment 10d of a device for batch calling according to the current invention. Embodiment 10d contains a first device, office computer 92, for maintaining a first sublist 302 (see FIG. 4) and second device, smartphone 94, for maintaining a second sublist 304. Office computer 92 is operated by a user 98a while smartphone 94 belongs to user 98a. Also shown is an office telephone 96 belonging to user 98a and connected to office computer 92. The workings of embodiment 10d will be explained in the discussion associated with FIG. 2-FIG. 4.

Figure 3:
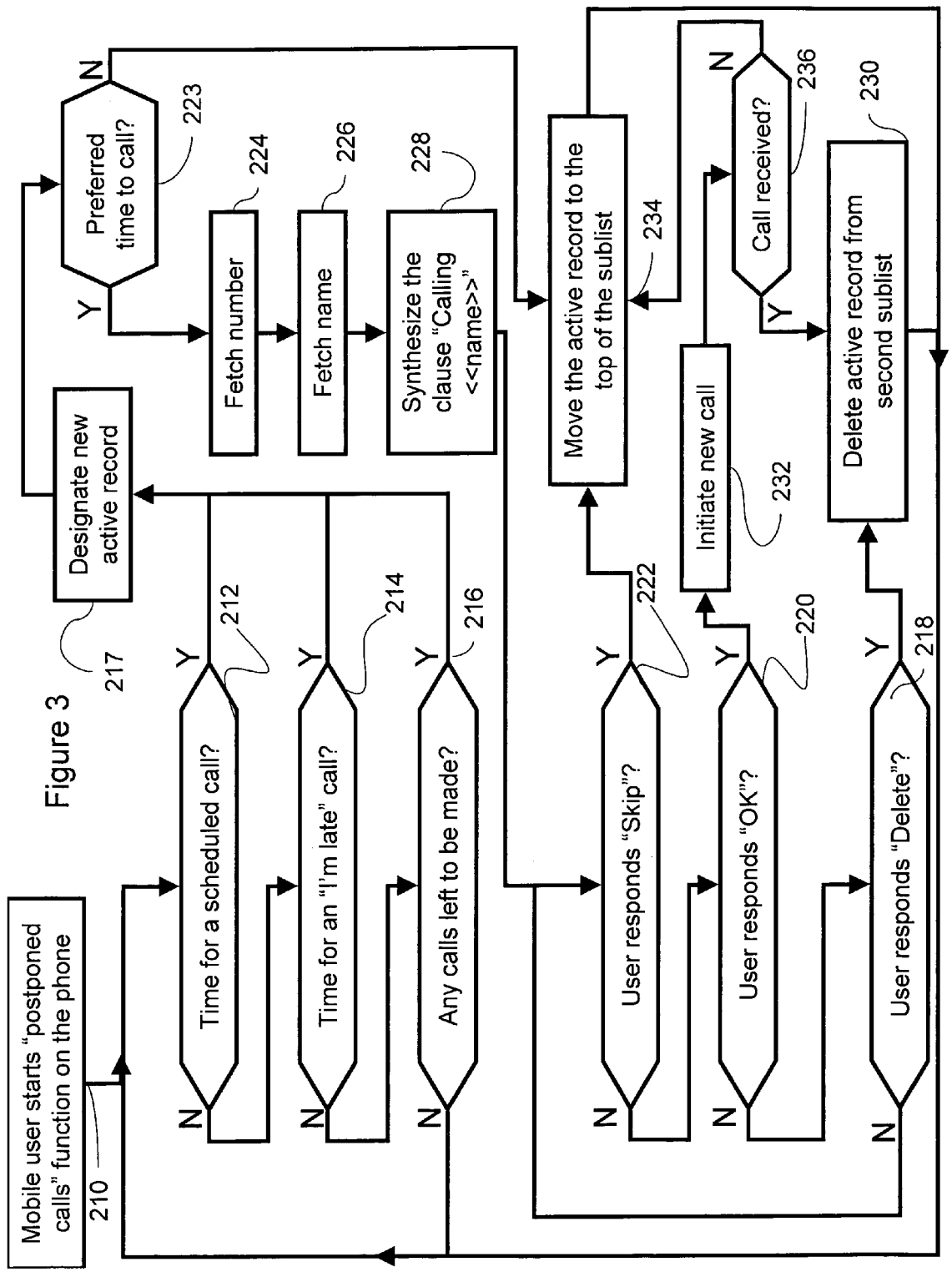
FIG. 3 is a flowchart of an offsite calling session according to the fourth embodiment of the present invention.

Attention is now called to FIG. 2-FIG. 4. FIG. 2 shows a simplified flowchart of an office session wherein pending phone tasks are postponed and stored in office computer 92 on a first sublist 302 (see FIG. 4) and then transferred to a second sublist 304. Second sublist 304 is directly accessible to smartphone 94 during an off site calling session according to the present invention. Thus, smartphone 94 is independent of office computer 92 in that smartphone 94 can access second sublist 304 of calling tasks and initiate calls to parties on second sublist 304 without intervention of office computer 92.

A user 98a logs on 120 to a first device, which in embodiment 10d is office computer 92. Automatically on logon, office computer 92 launches a list maintenance program. Upon entering the program, the system generates 122 an on-line connection with a second device, smartphone 94 and retrieves 122 a file containing a second sublist 304 of telephone calls that were neither executed nor deleted during the off-line period of office computer 92. The connection to smartphone 94 may be via any convenient communication channel, for example the Internet, an infrared connection, a USB cable, or a phone connection using a modem. Alternatively, second sublist 304 may reside at a location that is accessible to office computer 92 without an on-line connection and is accessed as necessary by smartphone 94 (in a manner similar to embodiment 10c).

Office computer 92 then synchronizes 124a first sublist 302 with retrieved second sublist 304, so that instances of records 320b and 320c that have already been executed, or have been deleted by user 98a from second sublist 304, (and therefore exist only on first sublist 302) will be removed from first sublist 302. Removal is illustrated by light shading in FIG. 4.

After synchronizing 124a first sublist 302 and second sublist 304, office computer 92 waits for instructions to perform 126 a maintenance operation on first sublist 302.

From time to time during the work session user 98a decides to save a pending call, postponing the call for later. To postpone a call, user 98a indicates to the program that user 98a would like to perform 126 a maintenance operation of adding 128 a new record to first sublist 302. In the example of embodiment 10d user 98a drags a received email message into a call list icon on office computer 92 thereby indicating that the author of the message (a travel agent) Jim@jettravel.co should be added to first sublist 302. Office computer 92 then extracts 129 the relevant information about the planned call, and adds it to a new record 324a on the top of first sublist 302. The minimum information necessary is the identity of the party, which herein is referred to as a name of the party. Specifically, office computer 92 first searches the email for an email signature identifying the sender and extracts a proper name and a phone number (if available); also office computer extracts a return address from the header of the email. If all of the extracted information is found in a single member of the contact list in office computer 92, then the contact is added to the call list. Otherwise the user is presented with a list of alternative names and phone numbers corresponding to the possible names and numbers in the email signature and corresponding members of the contact list. In the example of embodiment 10d the name Jim@jettravel.co is added to new record 324a in the first column 314a of first sublist 302. Generally new record 324a is added to the top of first sublist 302. In FIG. 4 new record 324a is shown on the bottom of first sublist 302 because record 324a has been moved in a reordering 134 operation as is explained herein below and illustrated by dotted arrow 328.

Optionally a record (e.g. 320a-j) may also contain one or more preferred phone numbers (in a second column 312a-b), the date upon which the record was added and an earliest (in a third column 316a-b) and latest (in a fourth column 318a-b) acceptable time to call the party. The program then updates 130 first sublist 302 by adding the name Jim@jettravel.com to record 324a. Processes 128-130 are repeated for each phone call that the user wants to postpone (note that the user may add multiple names to the calling list simultaneously, for example by marking multiple items in a contact list). In the case of new record 324a, the email does not contain a phone number in the return address. Therefore the call list program automatically adds through inclusion and linking a link 322 to the phone number of Jim in a contact list in office computer 92. Automatically, upon synchronization or access, link 322 will be updated to include the current phone number of Jim.

Instructions to perform 126 a maintenance operation are occasionally generated automatically by office computer 92. Particularly, during the work session, user 98a receives a phone call on office phone 96 from Bill Crown whose name appears on first sublist 302 in record 320a and in second sublist 304 in record 320f. In the conversation user 98a discusses all the business that user 98a needed to discuss with Bill Crown and therefore desires to remove records 320a and 320f from first sublist 302 and second sublist 304 respectively. In embodiment 10d, office telephone 96 is connected to office computer 92 such that office computer 92 tracks incoming and outgoing calls. Thus, office computer 92 recognizes that a call has been received from the number of Bill Crown. When office computer 92 detects that the conversation with Bill Crown has ended, office computer 92 prompts user 98a, "remove Bill Crown from call list?" User 98a responds by clicking OK on the screen prompt and office computer 92 deletes 132 record 320a from first sublist 302 (as illustrated by the horizontal cross out lines).

Similarly when user 98a calls a party from first sublist 302, at the end of the call, user 98a is prompted to remove the record associated with the called party from first sublist 302. Other incidents that might result in automatically generating a prompt to delete a record are receiving an email, receiving an sms message or a VOIP call from the party of the record. Similarly, due to certain occurrences, a call will be automatically added to list 302. For example, when user 98a makes a call on office phone 96 and the call is not answered, a record is automatically added 128 to list 302 with the phone number of the unanswered call.

Similarly, a record is automatically added to list 304 when an unanswered call is made from smartphone 94 and a record is deleted from list 304 when a call is received on smartphone 94 from the party associated with the record. In an alternative embodiment, smartphone 94 does not delete records from list 304 but rather, when synchronizing 124a first sublist 302 and second sublist 304, office computer 92 also downloads the recent call list from smartphone 94 and removes records of parties to whom outgoing calls were made and adds records for missed and unanswered calls. Occasionally, a list cleaning algorithm checks first sublist 302 and automatically offers to delete 132 records that have not been accessed for a long period of time and to update records when the phone number in the record of first sublist 302 is not in agreement with a phone number of the associated party stored in a contact list.

In the example of embodiment 10d, new record 324a is added 128 to the top of first sublist 302. As will be illustrated in FIG. 3, when calling from second sublist 304, the bottom record 320j is designated 217 as the active record to be called, thus embodiment 10d treats records with a last in last out rule. At times, a postponed call represented by new record 324a is more urgent than a call represented by an older record 320g-j. Thus in the example of embodiment 10d user 98a reorders 134 first sublist 302, moving (as illustrated by dotted arrow 328) new record 324a to the bottom of first sublist 302.

Once user 98a leaves the office and goes out—typically to drive to a meeting or home, user 98a initiates a log off process 138 by which the software of the present invention creates a file of pending calls, and synchronizes 124b first sublist 302 and second sublist 304 before logging off 140. In embodiment 10d, synchronization includes adding a new record 324b to second sublist 304 with the same data as new record 324a having link 322 replaced by an updated phone number, and removing record 320f (as illustrated by the horizontal cross out lines). Note that in the example of embodiment 10d new record 324a is on the bottom of first sublist 302 therefore new record 324b is added to the bottom of second sublist 304. User 98a will access second sublist 304 to make calls easily while on the way as is illustrated in FIG. 3 and the accompanying description. If the number of records in first sublist 302 on office computer 92 is larger than the memory allotted to second sublist 304 on smartphone 94, then user 98a transfers only a portion of the records in first sublist 302 to smartphone 94. Methods of synchronizing lists, adding, subtracting and modifying records are well known in the art.

In a preferred embodiment of the present invention, records may be added to either first sublist 302 or second sublist 304 by an authorized person from a third device. For example, a secretary of user 98a logged into a receptionist computer makes use of a local area network to add a record to first sublist 302 or sends a coded SMS message to smartphone 94. Smartphone 94 is programmed to interpret the coded SMS message and automatically extract information from the SMS message and add the information to a new record in list 304.

In another preferred embodiment of this invention, an authorized user can upload first sublist 302 of pending calls from office computer 92 to smartphone 94, using an automated synchronization service, known and used in the art for synchronization of calendars and email boxes.

In another preferred embodiment, user 98a downloads a new record from office computer 92 to smartphone 94 using the Internet or another convenient network.

In another preferred embodiment, user 98a downloads a new record to smartphone 92 from a third device. For example, user 98a uses smartphone 94 and an ftp server over the Internet to download a list of calls compiled by a secretary of user 98a on a receptionist computer.

In another alternative embodiment, link 322 is transferred as a link to smartphone 94, such that when user 98a instructs smartphone 94 to call Jim@jettravel.com, smartphone 94 will automatically seek an updated number either on a local contact list inside of smartphone 94, or alternatively smartphone 94 will seek the updated number over a network from an electronic phone book either on office computer 92, or a third device (for example an electronic phone book server or on a computer belonging to a secretary of user 98a).

In another alternative embodiment, multiple phone numbers exist in the contact list for Jim@jettravel.com and all of the numbers are transferred to second sublist 304. One number (the main number 222-326-5689) is stored in column 312b and all other numbers are stored in an additional column for alternative numbers.

FIG. 3 shows a preferred embodiment of the logical flow of the process of fourth embodiment 10d in mobile device 94.

When it is convenient for user 98a to make calls, user 98a activates 210 the service of the present invention using a key or a voice command on smartphone 94. Typically, the user will do this while in the car, out of the parking garage, buckled in the safety belt, and after making some spontaneous calls that he wants to make first.

Once the process has been activated 210, call list software checks the time and checks the scheduler of smartphone 94, to determine 212 if there are any pending scheduled calls to be made at this time. If there are any scheduled calls to be made, the program designates 217 the scheduled call as the active record and checks 223 if the current time is within the acceptable time to make the call (the current time is automatically acceptable since the call is scheduled now), and if so fetches 224 a number, extracts 226 a name, and prompts 228 user 98a presenting to him the active name and querying whether to make the call.

When there are no pending scheduled calls, the system optionally queries 214 the scheduler of smartphone 94 if there is a meeting that user 98 has to attend in the near future, typically in the next 30 minutes, then the program designates 217 the meeting reminder as an active record and checks 223 if the current time is within the acceptable time to make the call (the current time is automatically acceptable since the meeting is scheduled now), and fetches 224 a number of the organizer of the meeting, extracts 226 a name, and prompts 228 user 98a to make the call to advise the organizer that user 98a is late, or to ask about parking arrangements, or for any other reason.

Optionally smartphone 94 may be programmed to query 214 via a network for scheduled events stored on other devices. For example smartphone 94 may use an Internet connection to query 214 the scheduler on office computer 92. In an alternative embodiment, smartphone 94 may send a coded email message to a third device, for example the office computer of a secretary working for user 98a. The third device then automatically checks for scheduled items for user 98a and sends them back in a coded message to smartphone 94. Alternatively, the third device may spontaneously send a coded email (an example of coding for automatic interpretation is sending an email with a distinctive subject line, "call list scheduled items" and a formatted content, for example each line in the email representing a scheduled event, with the first word being the time, and the second word being the name of the organizer) to smartphone 94. When a new e-mail message is received, smartphone 94 automatically checks if the message includes a coded scheduler event.

Once all calls related to scheduled events have been processed, the system attends to the calls on second sublist 304. Particularly, the system finds 216 if there are calls left to make and if so designates 217 an active record from the pending, postponed calls to be made on second sublist 304. If there are no uncalled records on second sublist 304 then the call list software goes back and determines 212 if there are any pending scheduled calls to be made.

In this example of the use of embodiment 10d there are no scheduled calls, but there is a pending call on second sublist 304. Therefore, the program designates 217 an active record (new record 324b) from the bottom of second sublist 304 and checks 223 if the current time is an acceptable time for this call. Since new record 324 does not limit the preferred time for calling, then all times are acceptable. Therefore the system fetches 224 a number (222-326-5689) and extracts 226 a name (Jim@jettravel.com), and prompts 228 user 98a to make the call. Prompting 228 is accomplished by presenting to user 98a either on the screen of smartphone 94 or via a synthetic voice—a request for permission to make the call. A typical request will consist of the syntax "Calling Jim at jettravel dot com" or "Calling 222-326-5689". Smartphone 94 then waits for the response of user 98a.

Clearly, user 98a may not always be keen to make a particular call at the precise moment that the system prompts 228. For example, user 98a may be in a car with people whom should not overhear his travel plans, or user 98a may not wish to interrupt a song to which user 98a is listening. Therefore, in a preferred embodiment of this invention, user 98a can respond to prompt 228 in one of three ways: user 98a can confirm 220 the request, causing smartphone 94 to initiate 232 the call; or user 98a can pass 222 the request, causing the system to postpone 234 the call by moving the active record (new record 324b) to the top of the second sublist 304 and if there is a pending call (212, 214, or 216) automatically designate 217 a new active record (for example record 320j from second sublist 304); or the user can deny 218 the request instructing smartphone 94 to delete 230 the active record (new record 324b) from second sublist 304.

User 98a confirms 220 the call, then smartphone 94 initiates 232 the call, and monitors 236 if a connection has successfully been made. When the connection is successful, smartphone 94 maintains second sublist 304 by deleting 230 new record 324b, which is now defunct because the call to Jim@jettravel.com is no longer pending.

At the end of the current call, when either user 98a or Jim hangs up their phone, if there is a pending call (212, 214, or 216) the system automatically designates 217 a new active record (record 320j) and checks 223 if the current time is an acceptable time for the call. Particularly, since the current time 12:30, is between the earliest time 330 (11:00) and latest time 332 (13:00) for calling Herb Instance of record 320j, the system fetches 224 the number and extracts 226 the name and prompts 228 user 98a, "calling Herb Instance."

Alternatively, if the call to Jim of new record 324b had not been answered, smartphone 94 would have postponed 234 the active record (new record 324b) by moving the active record to the top of second sublist 304 and if there is a pending call (212, 214, or 216) designating 217 a new active record (record 320j). Thus new record 324b would remain in second sublist 304 to be called according to its turn later on in the current calling session or in another calling session.

FIG. 4 shows a database of the system of the current invention. Particularly, the database of FIG. 4 is pertinent to embodiment 10d. This table is often referred to herein as "the list". The list of embodiment 10d contains two sublists, first sublist 302, which resides on office computer 92 and second sublist 304, which resides in smartphone 94. Each one of first sublist 302 and second sublist 304 contains a first column 314a-b respectively to store a name of the party to be called, a second column 312a-b respectively to store a telephone number, adjusted to the area code and prefixes of the calling unit, a third column 316a-b respectively containing an earliest time to call and a fourth column 318a-b respectively containing a latest time to call. When a record is designated 217 as an active record at a time that is not acceptable to make a call (e.g. the current time is earlier than the earliest time to call or later than the latest time to call), then the active record is automatically skipped. The earliest and latest times to call are automatically updated according to a time zone of user 98a and a time zone associated with the area code of the active record.

It is understood that a list, as defined by the current invention is not limited to a self-standing database containing every record is in a single dedicated file as in FIG. 4. In an alternative embodiment, the pending call list of the current invention is a subset of one or more existing contact lists, each member of the pending call list being marked within an the already existing list (for example with a contact list). In another alternative embodiment, the pending call list is a set of links pointing to the addresses and locations of names in a plurality of memory devices connected by a network.

Optionally, when a call is generated automatically by converting a reminder of an upcoming appointment from a calendar, the system will automatically calculate the earliest and latest time for calling.

Returning to FIG. 3, in a preferred embodiment of the present invention, the system prompts 228 the user to make a call using one of multiple alternative methods depending on a state of smartphone 94. Particularly, when smartphone 94 is set to a normal state, then prompts are presented orally and responses are accepted orally as above. When smartphone 94 is being used to listen to an MP3 file, prompts are presenting using the "call waiting" mechanism of smartphone 94 and when smartphone 94 is set on "silent mode", prompts are presented using the vibration function and view screen of smartphone 94 while responses are accepted via the keypad.

In another preferred embodiment of the present invention, the system can accommodate participation in conference calls by including a bridge-number in the call list, and optionally the code number that has to be dialed after the call has been picked up, in order to access the conference call.

When user 98a returns to his office, user 98a logs on to office computer 92. At that time office computer 92 automatically synchronizes 124a first sublist 302 and second sublist 304.

FIG. 5 shows a simplified block diagram of an embodiment of the present invention, comprising the host part of the system 410 and the mobile part of the system 412.

In the host part of the system 410, an authorized person 448 postpones phone calls from several sources, which provide information about the phone call to be made, the number to be called and the name of the party. These include:

A contact list 414 such as the one in Microsoft Outlook—right clicking 446 a contact and choosing the "add to call list" menu item causes a list maintenance program 428 to create a new record in host sublist 402 for the pending call and add the corresponding name and phone number to the new record.

An appointment list 416 of the same Outlook product—right clicking 446 on an appointment and choosing the "add to call list" menu item causes maintenance program 428 to extract the name and phone number of the host of the appointment and add them in a new record to host sublist 402.

An outgoing email 418—right clicking 446 on the outgoing mail message and choosing the "add to call list" menu item causes maintenance program 428 to create a new record in host sublist 402 for the pending call and add the corresponding name and phone number of the mail recipient to the new record.

An incoming email 420—right clicking 446 a message and choosing the "add to call list" menu item causes maintenance program 428 to create a new record in host sublist 402 for the pending call and add the corresponding name and phone number of the sender to the new record.

An on-going voice over Internet (VOIP) call 422—right clicking 446 the corresponding icon and choosing the "add to call list" menu item causes maintenance program 428 to create a new record in host sublist 402 for the pending call and add the corresponding name and phone number of the recipient of the call to the new record.

Any segment of text 424—right clicking 446 selected segment of text 424 and choosing the "add to call list" menu item causes maintenance program 428 to create a new record in host sublist 402 for the pending call and search for and extract the first number that appears to be a telephone number and the first text string that appears to be a name in segment of text 424. Particularly, in the example of FIG. 5 the process begins by finding an obvious name in the text—two capitalized words that are not found in the standard dictionary and are separated only by a space, or by one letter and a dot or a comma. If no obvious names are found then the program searches for any capitalized word that is not listed in the standard dictionary. Then the program searches for a telephone number. First the program seeks a key word such as "tel" or "phone" or "mobile". If a keyword is found, followed by 7 or more digits without separating letters, then the digits are taken to be the telephone number. A prefix is attached to the number in accordance with the dialing rules, so that "+1-301-742-5314" is converted to "13017425314" while "(972) 3 2432655" is converted to "00197232432655". If no key words are found, or the key word is not followed by a string of at least seven digits, then a search is made for a three and four digit number separated by a dash, or a seven digit number, or a ten digit number. All of the candidate numbers and names are collected. Then the contact list 414 is searched for the identified names and numbers. If there is only one name and number or if all the names and numbers correspond to a single entry in contact list 414 then the entry is added to call list 402. Otherwise authorized person 448 is prompted with a choice of names, phone numbers and corresponding entries from contact list 414.

Clearly, the system of the present invention is not limited to the above examples and can use other means of capturing items and converting them into pending telephone calls.

Authorized person 448 can also edit host sublist 402 manually by adding, removing or changing parameters of calls, using any conventional text editor 426.

In the mobile part of the system 412, a mobile sublist 404 is accessed by a processor 440 that runs the software described in FIG. 3. Calls are offered 442 to a user 98b, either visually on the screen or by voice, and the response 444 of user 98b is communicated either via a keypad or via a voice command, and is processed to determine which calls should be initiated. Calls are then sent to a phone module 438, which initiates the call.

While the invention has been described with respect to a limited number of embodiments, it will be appreciated that many variations, modifications and other applications of the invention may be made.

What is claimed is:

1. A system for management of a calling task for a user comprising:
   a) a list that contains at least one record, each record of said list including a name and each record of said list representing a pending calling task to a party associated with said name;
   b) a first device comprising:
      a computer processor for controlling operation of the first device; and
      a computer-readable storage medium storing program code for causing said computer processor:

(i) to create and maintain said list, (ii) to enable a user to add as a record to the list, at any given time, a call postponed by the user, and (iii) to automatically designate, from time to time, one of said at least one record as being a currently active record; and c) a second device, communicatively coupled with said first device, configured to initiate an outgoing call to the party associated with the name included in said currently active record, at any desired time upon activation of a postponed calls function by the user, wherein the program code causes said computer processor to automatically designate the call postponed by the user as being the currently active record at a time later than the given time.

2. The system of claim 1, wherein the program code causes said computer processor to facilitate adding of a new record containing a particular name to said list by dragging and dropping an object associated with said particular name into an icon associated with said list.

3. The system of claim 2, wherein said object is selected from the group consisting of a contact from a contact list, a received e-mail message, a sent e-mail message, a dialed Voice over IP telephone conversation, a segment of text, an Outlook task, and an Outlook appointment.

4. The system of claim 2, wherein said new record includes a telephone number and said telephone number is associated with said new record using inclusion and linking.

5. The system of claim 1, wherein the program code further causes said computer processor to maintain said list by performing at least one maintenance operation selected from the group consisting of deleting a defunct record, adding a new record, downloading a new record from said second device, and downloading a new record from a third device.

6. The system of claim 1, wherein the program code further causes said computer processor to convert a reminder of an approaching appointment into said currently active record.

7. The system of claim 1, wherein at least one record of said list further includes an alternative telephone number.

8. The system of claim 1, wherein at least one party is a plurality of people and at least one pending calling task corresponds to a conference call.

9. The system of claim 1, wherein said second device is further configured to present said name included in said currently active record to the user and to receive a response, from the user.

10. The system of claim 9, wherein said response is selected from the group consisting of initiating said outgoing call, skipping said currently active record and deleting said currently active record from said list.

11. The system of claim 9, wherein said second device is further configured to employ a mode of presentation of said name included in said currently active record, corresponding to a state of said second device.

12. The system of claim 1, wherein the program code further causes said computer processor to add a new record to said list in response to an instruction of a person from a plurality of authorized persons.

13. The system of claim 12, wherein the program code further causes said computer processor to receive said instruction over a network.

14. The system of claim 13, further comprising d) a third device, communicatively coupled with said first device, configured to convey said instruction to said first device.

15. The system of claim 1, wherein said currently active record further includes a time interval acceptable to initiate said outgoing call.

16. The system of claim 15, wherein the program code causes said computer processor to skip said outgoing call when a current time is outside of said time interval.

17. The system of claim 16, wherein said current time is adjusted according to a caller time zone and a time zone of said party.

18. The system of claim 1, wherein the program code further causes said computer processor to perform a maintenance operation on said list in response to an incident.

19. The system of claim 18, wherein said incident is a member of the group consisting of initiating of said outgoing call, initiating of a call to a party associated with one of said records, receiving a call from a party associated with one of said records, receiving an SMS message from a party associated with one of said records, receiving an e-mail from a party associated with one of said records, receiving an instruction conveyed via a data communication service from an authorized person, receiving an instruction from an automatic list cleaning algorithm, receiving by said second device of an unanswered telephone call, initiating on said second device of an unanswered call, initiating on said second device of a call to a party associated with one of said records, downloading information from a third device and receiving a scheduled instruction.

20. The system of claim 1, wherein the program code causes said computer processor to add a new record to said list in response to an occurrence.

21. The system of claim 20, wherein said occurrence is a member of the group consisting of an Outlook scheduled notice, a time lapse since a previous call, a missed call, and an unanswered call.

22. The system of claim 1, wherein said first device and said second device are included in a mobile phone.

23. The system of claim 1, wherein said second device is a mobile device and said first device is separate from said mobile device, the system further comprising:

d) a communication channel for transferring said currently active record from said first device to said mobile device.

24. The system of claim 1, wherein said first device is located at a site and said second device is configured to initiate said outgoing call off said site, the system further comprising:

d) a communication channel for transferring said currently active record from said first device to said second device.

25. The system of claim 1, wherein said second device is independent from said first device and wherein said list includes a first sublist residing in said first device and a second sublist residing in said second device the system further comprising:

d) a communication channel for synchronizing said first sublist and said second sublist.

26. The system of claim 25, wherein the program code causes said computer processor to detect a record which is contained only in said first sublist and to effect said synchronizing by performing at least one operation selected from the group consisting of copying said record from said first sublist to said second sublist, moving said record from said first sublist to said second sublist and deleting said record from said first sublist.

27. The system of claim 25, wherein said second device is configured to maintain said second sublist.

28. The system of claim 27, wherein said second device is configured to perform a maintenance operation in response to an incident.

29. The system of claim 23, wherein said first device is a personal computer and said second device is a mobile phone.

30. A computer processor-based method for postponing an outgoing calling task for a user, the method comprising:
  a) compiling, by a computer processor controlled electronic device, a list containing at least one record, wherein each record of said list includes a name and wherein each record of said list represents a pending calling task to a party associated with said name, comprising:
    enabling, by the electronic device, a user to add as a record to the list, at any given time, a postponed call; and
    automatically designating, by the electronic device, from time to time, one of said at least one record as being a currently active record;
  b) transferring, by the electronic device, said currently active record to a second device, and
  c) initiating, automatically by said second device, an outgoing call to the party associated with the name included in said currently active record, at any desired time upon activation of a postponed calls function by the user,
wherein said automatically designating automatically designates the call postponed by the user as being the currently active record at a time later than the given time.

31. The method of claim 30, further comprising:
  d) adding a record to said list in response to the user dragging and dropping an object associated with a name into an icon associated with said list.

32. The method of claim 30, further comprising:
  e) prompting by said second device of the user to initiate said outgoing call, and
wherein said initiating is performed subsequent to said prompting.

33. The method of claim 30, wherein said second device is a mobile device.

34. A computer processor-based method for postponing an outgoing calling task for a user, the method comprising the steps of:
  a) compiling, by a computer processor controlled electronic associated therewith, comprising:
    enabling, by the electronic device, a user to add as a record to the list, at any given time, a call postponed by the user; and
    automatically designating, by the electronic device, at a time later than the given time, one of said at least two records as being a currently active record;
  b) transferring, by the electronic device, said currently active record to a second device; and
  c) initiating, automatically by said second device, an outgoing call to the party associated with said currently active record at any desired time upon activation of a postponed calls function by the user,
wherein, upon completion of said outgoing call, said automatically designating automatically designates another record from said at least two records as being the currently active record.

\* \* \* \* \*